United States Patent
Sheller et al.

(10) Patent No.: US 11,556,730 B2
(45) Date of Patent: Jan. 17, 2023

(54) METHODS AND APPARATUS FOR DISTRIBUTED USE OF A MACHINE LEARNING MODEL

(71) Applicant: Intel Corporation, Santa Clara, CA (US)

(72) Inventors: Micah Sheller, Hillsboro, OR (US); Cory Cornelius, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1240 days.

(21) Appl. No.: 15/942,131

(22) Filed: Mar. 30, 2018

(65) Prior Publication Data

US 2019/0042878 A1    Feb. 7, 2019

(51) Int. Cl.
| | |
|---|---|
| G06K 9/62 | (2022.01) |
| H04L 67/10 | (2022.01) |
| G06N 20/00 | (2019.01) |
| G06F 16/951 | (2019.01) |
| G06N 3/063 | (2006.01) |
| G06F 21/62 | (2013.01) |
| G06N 3/04 | (2006.01) |
| G06F 21/74 | (2013.01) |
| G06N 3/08 | (2006.01) |
| G06N 99/00 | (2019.01) |

(52) U.S. Cl.
CPC ......... *G06K 9/6217* (2013.01); *G06F 16/951* (2019.01); *G06F 21/6245* (2013.01); *G06F 21/74* (2013.01); *G06K 9/6269* (2013.01); *G06N 3/04* (2013.01); *G06N 3/0454* (2013.01); *G06N 3/063* (2013.01); *G06N 3/08* (2013.01); *G06N 20/00* (2019.01); *G06N 99/00* (2013.01); *H04L 67/10* (2013.01)

(58) Field of Classification Search
None
See application file for complete search history.

(56) References Cited

U.S. PATENT DOCUMENTS

| | | |
|---|---|---|
| 2014/0181925 A1 | 6/2014 | Smith et al. |
| 2014/0189356 A1 | 7/2014 | Phegade et al. |
| 2014/0282868 A1 | 9/2014 | Sheller et al. |
| 2014/0282893 A1 | 9/2014 | Sheller et al. |

(Continued)

OTHER PUBLICATIONS

Sebastian Ruder, "An Overview of Multi-Task Learning in Deep Neural Networks" May 29, 2017,[http://ruder.io/multi-task/], retrieved on-line Jun. 29, 2018 , 21 pages.

(Continued)

*Primary Examiner* — June Sison
(74) *Attorney, Agent, or Firm* — Hanley, Flight & Zimmerman, LLC

(57) ABSTRACT

Methods, apparatus, systems and articles of manufacture for distributed use of a machine learning model are disclosed. An example edge device includes a model partitioner to partition a machine learning model received from an aggregator into private layers and public layers. A public model data store is implemented outside of a trusted execution environment of the edge device. The model partitioner is to store the public layers in the public model data store. A private model data store is implemented within the trusted execution environment. The model partitioner is to store the private layers in the private model data store.

19 Claims, 8 Drawing Sheets

(56) References Cited

U.S. PATENT DOCUMENTS

| | | |
|---|---|---|
| 2014/0282945 A1 | 9/2014 | Smith et al. |
| 2014/0366111 A1 | 12/2014 | Sheller et al. |
| 2015/0143118 A1 | 5/2015 | Sheller et al. |
| 2015/0222633 A1 | 8/2015 | Smith et al. |
| 2015/0235024 A1 | 8/2015 | Corrion et al. |
| 2015/0281279 A1 | 10/2015 | Smith et al. |
| 2015/0304736 A1 | 10/2015 | Lal et al. |
| 2015/0341332 A1 | 11/2015 | Smith et al. |
| 2015/0363582 A1 | 12/2015 | Sheller et al. |
| 2015/0373007 A1 | 12/2015 | Sheller et al. |
| 2016/0006732 A1 | 1/2016 | Smith et al. |
| 2016/0174031 A1 | 6/2016 | Smith et al. |
| 2016/0180068 A1 | 6/2016 | Das et al. |
| 2016/0180078 A1 | 6/2016 | Chhabra et al. |
| 2016/0180093 A1 | 6/2016 | Goss et al. |
| 2016/0182502 A1 | 6/2016 | Smith et al. |
| 2016/0188350 A1 | 6/2016 | Shah et al. |
| 2016/0188848 A1 | 6/2016 | Smith et al. |
| 2016/0188853 A1 | 6/2016 | Smith et al. |
| 2016/0283411 A1 | 9/2016 | Sheller et al. |
| 2017/0085565 A1 | 3/2017 | Sheller et al. |
| 2017/0142089 A1 | 5/2017 | Sheller et al. |
| 2017/0147822 A1 | 5/2017 | Goss et al. |
| 2017/0154179 A1 | 6/2017 | Corrion et al. |
| 2017/0169231 A1 | 6/2017 | Chhabra et al. |
| 2017/0180363 A1 | 6/2017 | Smith et al. |
| 2017/0214526 A1 | 7/2017 | Smith et al. |
| 2017/0244684 A1 | 8/2017 | Smith et al. |
| 2017/0318016 A1 | 11/2017 | Smith et al. |
| 2017/0374509 A1 | 12/2017 | Smith et al. |
| 2018/0136912 A1* | 5/2018 | Venkataramani ........ G06N 3/04 |
| 2018/0375638 A1* | 12/2018 | Khanna .................... G06N 3/04 |
| 2019/0050683 A1* | 2/2019 | Gupta Hyde ........ G06K 9/6257 |
| 2019/0303504 A1* | 10/2019 | Pasumarthy ........... G06Q 50/01 |
| 2019/0377897 A1* | 12/2019 | Griffin .................. G06Q 10/06 |
| 2019/0392305 A1* | 12/2019 | Gu .......................... G06F 21/53 |
| 2020/0125737 A1* | 4/2020 | Zhao ...................... G06N 20/00 |
| 2020/0242268 A1* | 7/2020 | Epasto ..................... G06N 5/04 |
| 2020/0274898 A1* | 8/2020 | Xie ........................ G06F 21/53 |
| 2021/0112038 A1* | 4/2021 | Karame .............. G06F 21/6254 |
| 2021/0125051 A1* | 4/2021 | Linton ................. G06N 3/0454 |
| 2021/0133577 A1* | 5/2021 | Srinivasan ............. G06N 3/063 |
| 2021/0232498 A1* | 7/2021 | Zhang ................ G06F 11/3608 |
| 2021/0264274 A1* | 8/2021 | Kellerman ............... G06N 3/08 |

OTHER PUBLICATIONS

Tensorflow "How to Retrain Inception's Final Layer for New Categories", Jan. 27, 2018, [http://www.tensorflow.org/tutorials/image_retraining], retrieved on-line Jun. 29, 2018, 9 pages.

Tensorflow, "Image Recognition" [http://www.tensorflow.org/tutorials/image_recognition], Feb. 16, 2018, retrieved on-line Jun. 29, 2018, 6 pages.

\* cited by examiner

METHODS AND APPARATUS FOR DISTRIBUTED USE OF A MACHINE LEARNING MODEL

FIELD OF THE DISCLOSURE

This disclosure relates generally to machine learning training, and, more particularly, to methods and apparatus for distributed use of a machine learning model.

BACKGROUND

Deep learning (DL) is an important enabling technology for the revolution currently underway in artificial intelligence, driving truly remarkable advances in fields such as object detection, image classification, speech recognition, natural language processing, and many more. In contrast with classical machine learning, which often involves a time-consuming and expensive step of manual extraction of features from data, deep learning leverages deep artificial neural networks (NNs), including convolutional neural networks (CNNs), to automate the discovery of relevant features in input data.

Training of a neural network is an expensive computational process. Such training often requires many iterations until an acceptable level of training error is reached. In some examples, millions of training iterations of might be needed to arrive at the global minimum error. Processed by a single entity, such iterations may take days, or even weeks, to complete. To address this, distributed training, where many different edge devices are involved in the training process, is used to distribute the processing to multiple nodes.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
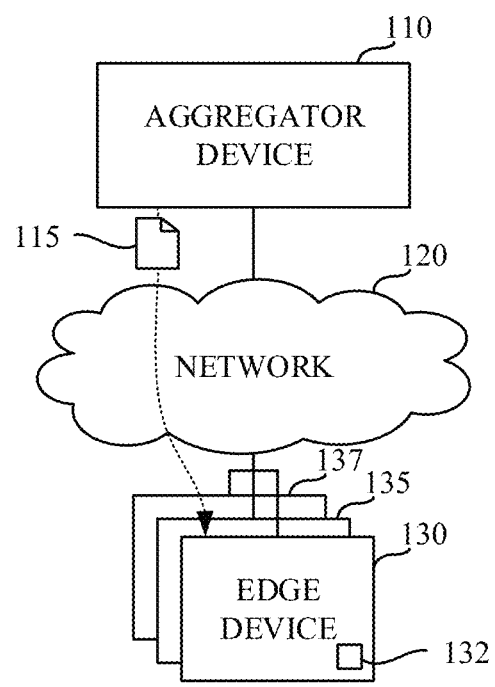
FIG. 1 is a block diagram of an example system constructed in accordance with teachings of this disclosure to enable distributed use of a machine learning model.

Federated and/or distributed learning enables a model to be trained using data across many edge systems without having to centralize the data used for such training. Edge devices perform local training, and provide training results to an aggregator device, which aggregates the training results among the multiple edge devices to update a centralized model, which can then be re-distributed to the edge devices for subsequent training and/or use. Such an approach facilitates many advantages such as, for example, bandwidth conservation (training data is already present at the edge device) and privacy (potentially private training data is not distributed outside of the edge that trained using that private training data).

However, because Federated and/or distributed learning is typically implemented such that training is performed at the edge, various attack vectors to either discover or tamper with the model might be used. For example, an edge may lie about its training and submit training results that bias and/or disrupt the model (e.g., a malicious update attack). Malicious update attacks can be harmful to the model itself. Because existing aggregator devices cannot distinguish between legitimate and malicious updates, the aggregator may inadvertently incorporate malicious results into the updated model. Some existing approaches attempt to mitigate these potential attacks by utilizing a Byzantine Gradient Descent when aggregating training results. The Byzantine Gradient Descent approach enables filtering of extreme edge results, provided the number of malicious updates is less than some predefined constant. The higher the constant, the greater the negative impact that the algorithm has on model convergence. If there are too many malicious updates, the aggregator cannot assure robustness.

An edge may attempt to discover the model parameters and/or structures, which may themselves be intellectual property (model stealing attacks). An edge may conduct an adaptive data extraction attack to attempt to reconstruct another edge's private data (e.g., a data extraction attack). An edge may lie about how much data the edge has used for training to attempt to gain larger influence over aggregated results (e.g., a data-size influence attack). An edge may conduct a Sybil attack in order to gain larger influence over aggregated results (e.g., a Sybil influence attack). An edge may poison their training data to introduce backdoors into the model (e.g., a data poisoning attack), and may even adapt the poisoned data over time to achieve limited forms of other attacks (e.g., an adaptive data poisoning attack).

Machine learning models that are implemented and/or utilized by edge devices can be thought of as two groups of layers: feature extractor layers, and classifier layers. Feature extractor layers work best when they are generic (e.g., specific to the type of input, not the problem space), while classifier layers are specific to the input data itself and, as a result, are often proprietary. Feature extractor layers are typically large, while classifier layers are typically smaller. For example, in a typical machine-learning model, the feature extraction layers contribute 99.5% of the memory and/or processor requirements, while 0.5% of the memory and/or processor requirements are contributed by the classification layers. Example approaches disclosed herein implement the classification layers within a trusted execution environment (TEE), thereby ensuring that proprietary pieces of the model are kept confidential. The computationally expensive, but generic, feature extractor layers are implemented outside of the TEE. That is, the classification layers are private, while the feature extraction layers are public.

FIG. 1 is a block diagram of an example system constructed in accordance with teachings of this disclosure to enable distributed training of a machine learning model. The illustrated example of FIG. 1 includes an aggregator device 110, a network 120, and edge devices 130, 135, 137. The example aggregator device 110 provides a model 115 to the edge devices 130, 135, 137 via the network 120. Example approaches disclosed herein utilize a Trusted Execution Environment (TEE) implemented at the edge device(s) 130, 135, 137. In the illustrated example of FIG. 1, the example edge device 130 includes a TEE 132. In examples disclosed herein, a TEE is a secure area within a main processor of the device. However, any other approach to implementing a TEE may additionally or alternatively be used such as, for example, a dedicated secure processor. The secure area implemented by the TEE ensures that code and/or data loaded into the TEE is protected with respect to confidentiality and integrity. In some examples, the TEE is referred to as a secure enclave. The TEE functions as an isolated execution environment that provides security features such as, for example, isolated execution, integrity of Trusted Applications, and/or confidentiality. In some examples, the TEE provides hardware-based mechanisms to respond to remote attestation challenges that validate the integrity of the instructions executed within the TEE. In this manner, model training is conducted with integrity and the model parameters can be kept confidential.

While examples disclosed herein are described in the context of training and/or utilizing a neural network, any other machine-learning model trained using any approach such as, for example, gradient averaging, linear regression, logistic regression, support vector machines, etc.

While the illustrated example of FIG. 1 shows TEEs implemented the edge devices 130, 135, 137, in some examples, a TEE may be implemented at the aggregator device 110. In some examples, TEEs may be implemented only in some of the edge devices. When aggregating training results from the edge devices 130, 135, 137, the example aggregator device 110 may incorporate results differently depending on whether the results were provided by an edge device that implemented a TEE or not. For example, the example aggregator may apply Byzantine Gradient Descent (BGD) to training results provided by edge devices that do not implement a TEE to ensure that extreme edge training results are ignored. In some examples, a modified form of BGD may be used such that a final median is taken from a set of parameters whose majority is from trusted edges.

In examples disclosed herein, the aggregator device 110 is implemented by a server. However, any other type of computing platform may additionally or alternatively be used such as, for example a desktop computer, a laptop computer, etc. In some examples, the example aggregator device 110 throttles the ability of edge devices to submit updates to the model, thereby limiting the ability of an attacker to maliciously affect the model.

In examples disclosed herein, the example aggregator device 110 provides a current state of the machine learning model to each edge device 130, 137. Each edge device may then perform local training and provide training results to the aggregator device 110 for aggregation. The example aggregator device 110 accesses the results provided by the edge devices 130, 137. In some examples, the model updates are aggregated as they arrive at the aggregator device 110 (e.g., in a streaming average). In some examples, Byzantine Gradient Descent is used to exclude extreme model update results.

In some examples, the example aggregator device 110 aggregates model updates from trusted edge devices. That is, if a model update is received from a trusted edge device (e.g., an edge device that implements a trusted execution environment), such updated model information is automatically included in the aggregation. In examples disclosed herein, the example aggregator device 110 applies Byzantine Gradient Descent to model updates that originate from non-trusted edge devices. Applying Byzantine Gradient Descent to model updates originating from non-trusted edge devices enables elimination of extreme model updates (which may potentially be malicious). In some examples, the example aggregator device 110 throttles the aggregation of updates, thereby allowing a given node to influence the central model every N training iterations.

Using the aggregated model updates, the example aggregator device 110 updates a centrally stored model. The updated model then serves as a new model for the next training iteration, and is provided to the edge devices (shown as the model 115 in the illustrated example of FIG. 1). By allowing multiple training iterations to be performed, the example system enables models to be adjusted over time to adapt to changing input data.

The network 120 of the illustrated example is a public network such as, for example, the Internet. However, any other network could be used. For example, some or all of the network 120 may be a company's intranet network (e.g., a private network), a user's home network, a public network (e.g., at a coffee shop). In examples disclosed herein, the network 120 transmits Ethernet communications. However, any other past, present, and/or future communication protocols may additionally or alternatively be used.

The example edge device(s) 130, 135, 137 of the illustrated example of FIG. 1 is implemented by a computing platform such as, for example an Internet of Things (IoT) device, a smartphone, a personal computer, etc. In examples disclosed herein, the example edge devices may be utilized by any type of entity such as, for example, a corporate institution, a bank, a government, an end user, etc. In some examples, a small number of edge devices are used (e.g., five devices). However, any number of edge devices may additionally or alternatively be used. For example, an edge device may be implemented as an IoT device, of which there may be thousands of devices, millions of devices, etc.

In examples disclosed herein, the TEE 132, implemented at the edge device 130 is implemented using Intel® SGX technology to ensure that code executed and/or data stored at the aggregator device 110 is trusted and/or protected. However, any other type of trusted execution environment may additionally or alternatively be used. When implementing the TEE 132, the example edge device 130 may be thought of as a trusted edge device.

In some other examples, the TEE 132, when implemented at the edge device, utilizes data update throttling to limit the ability of an attacker to perform training using un-trusted data.

While in many examples, implementing the TEE 132 at the edge device 130, 135, 137 provides added levels of security, such added security may result in reductions to the processing power of the edge device 130, 135, 137 that may be applied to the processing and/or training tasks (e.g., due to overhead of operation of the TEE). That is, in some examples, processing of information using the TEE may require more computation power and/or memory than can be provided via the TEE.

In examples disclosed herein, models that are trained and/or utilized at the edge devices are divided into public layers and private layers. Public layers are utilized outside of the TEE 132 and are not subject to security requirements imposed on the private layers, which are implemented within the TEE 132.

Figure 2:
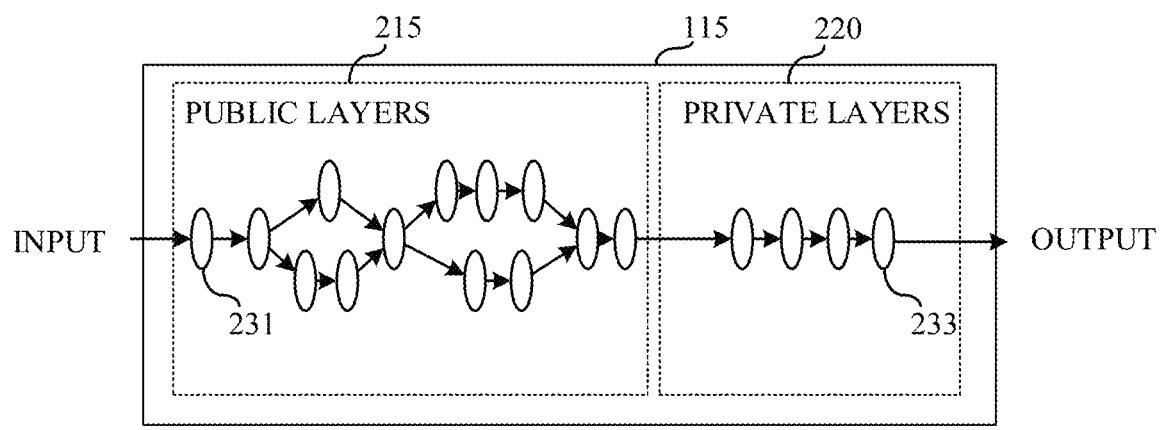
FIG. 2 is a block diagram of an example model that may be utilized by the edge device.

FIG. 2 is a block diagram of an example model 115 that may be utilized by the edge device 130. The example model 115 includes public layers 215 and private layers 220. To utilize the layers of the model 115, an input (e.g., an input file) is received at a first layer 231 (e.g., one of the public layers), and is progressively processed through each of the layers in the model 115 until an output is produced by a final layer 233. In examples disclosed herein, the output represents a classification output, however any other type of output may additionally or alternatively be produced.

In examples disclosed herein, the public layers 215 represent feature extractor layers. The public layers 215 of FIG. 2 are generic, and therefore are specific to the type of input (e.g., file type, data format, etc.), not the problem space. In examples disclosed herein, the public layers 215 are specific to the type of training data, (e.g., images of people, speech audio, medical records, etc.), and are agnostic to the exact data itself (e.g., individual faces, speakers, patients, etc.), as well as are agnostic to the task (e.g., biometric, dictation, diagnosis, etc.).

In examples disclosed herein, the private layers 220 represent classification layers. The private layers 220 are specific to the input data itself and/or the features extracted from that input data by the feature extractor layers.

In the illustrated example of FIG. 2, the public layers 215 precede the private layers 220 in order of processing. That is, the public layers are each processed before their output is provided as an input to the private layers. However, in some examples, the public and private layers may be mixed (e.g., a public layer may be intermediate one or more private layers). For example, a private layer for identifying features within a particular type of data may be considered proprietary (e.g., private), and an output of that feature extraction layer may be processed by another feature extraction layer that is not proprietary (e.g., public).

In the illustrated example of FIG. 2, the public layers 215 include thirteen layers and the private layers 220 include four layers. However, in practice, any number of layers may be utilized. In many examples, the public layers 215 make up the majority of the number of layers. Moreover, in some examples, the layers may be arranged using any combination of serial and parallel layers.

Figure 3:
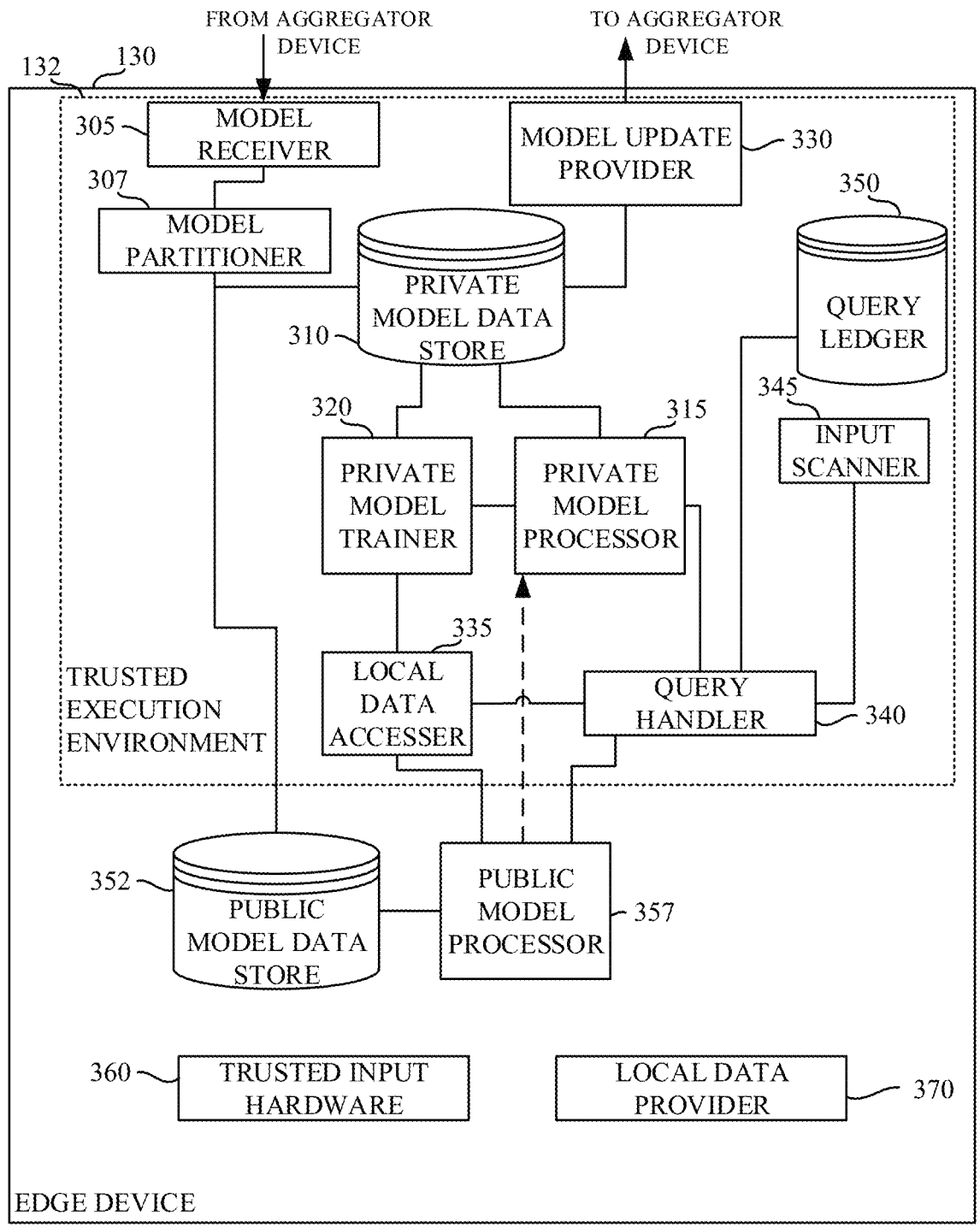
FIG. 3 is a block diagram of an example implementation of the example edge device of FIG. 1.

FIG. 3 is a block diagram of an example implementation of the example edge device 130 of FIG. 1. The example edge device 130 includes a model receiver 305, a model partitioner 307, a private model data store 310, a private model processor 315, a private model trainer 320, a model update provider 330, a local data accesser 335, a query handler 340, an input scanner 345, a query ledger 350, a public model data store 352, a public model processor 357, trusted input hardware 360, and a local data provider 370.

In the illustrated example of FIG. 3, the example model receiver 305, the example model partitioner 307, the example private model data store 310, the example private model processor 315, the example private model trainer 320, the example model update provider 330, the example local data accesser 335, the example query handler 340, the example input scanner 345, and/or the example query ledger 350 are implemented within the trusted execution environment 132. However, in some examples, one or more of the example model receiver 305, the example model partitioner 307, the example private model data store 310, the example private model processor 315, the example private model trainer 320, the example model update provider 330, the example local data accesser 335, the example query handler 340, the example input scanner 345, and/or the example query ledger 350 may be implemented outside of the trusted execution environment 132. In some examples, the trusted input hardware 360 is implemented within the trusted execution environment 132.

In contrast, the example public model data store 352 and the public model processor 357 are implemented outside of the trusted execution environment 132. Implementing the example public model data store 352 and the public model processor 357 outside of the trusted execution environment 132 enables the example public model data store 352 and the public model processor 357 to access additional computing resources of the example edge device 130 that are not subject to the security restrictions imposed on elements that operate inside the trusted execution environment 132.

The example local data provider 370 of the illustrated example of FIG. 3 is implemented outside of the trusted execution environment 132. However, in some examples, additional measures may be taken such that trust can be established between the components executed within the trusted execution environment 132 and the local data provider 370 executed outside of the trust execution environment.

The example model receiver 305 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example model receiver 305 receives the current state of the machine learning model (e.g., the model 115 stored at the aggregator device 110). In some examples, additional instructions accompany the model such as, for example, threshold values that are to be used by the edge device when performing training, processing queries against the model, and/or providing updates to the model to the aggregator device 110. The example model receiver 305 provides the received model to the example model partitioner 307.

The example model partitioner 307 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example model partitioner 307 processes the model (e.g., the model 115 of FIG. 1) received by the model receiver 305 to separate the model into private layers and public layers.

Such processing begins with the example model partitioner 307 identifying the layers included in the model. For each of the identified layers, the example model partitioner 307 determines whether the layer is a public layer. In some examples, private layers are encrypted to ensure that the private nature of those layers is protected while the model is being transmitted from the aggregator 110 to the edge device 130. In such an example, the example model partitioner 307 determines whether the layer is private or public based on whether the layer is encrypted. Thus, if a layer is not encrypted, the layer is identified as public, otherwise it is identified as private.

In some examples, other approaches for determining whether the layer is private or public may additionally or alternatively be used. For example, the example model partitioner 307 may determine whether the layer is private or public based on a type of the layer. Many different types of machine learning layers may be used as components of the model such as, for example, a convolutional layer, a pooling layer, a fully connected layer, a concatenation layer, a normalization layer, a dropout layer, a softmax layer, etc. In some examples, particular types of layers are indicative of layers that perform feature extraction. For example, convolutional layers are more likely to be used for feature extraction tasks (e.g., are public layers), whereas softmax layers are more likely to be used as classification tasks (e.g., are private layers).

The example model partitioner 307, when identifying a public layer, stores the public layer in the public model data store 352. Conversely, if the example model partitioner 307 identifies a layer as a private layer, the example model partitioner 307 stores the layer in the private model data store 310. When storing the private layer in the private model data store 310, the example model partitioner 307 may, in some examples, decrypt the private layer (and/or the parameters identified as components of that layer) to ensure that the layer is usable by the private model processor 315.

The example private model data store 310 of the illustrated example of FIG. 3 is implemented by any memory, storage device and/or storage disc for storing data such as, for example, flash memory, magnetic media, optical media, etc. Furthermore, the data stored in the private model data store 310 may be in any data format such as, for example, binary data, comma delimited data, tab delimited data, structured query language (SQL) structures, etc. While in the illustrated example the private model data store 310 is illustrated as a single element, the example private model data store 310 and/or any other data storage elements described herein may be implemented by any number and/or type(s) of memories. In the illustrated example of FIG. 3, the private model data store 310 stores private model information (e.g., private layers) received from the model partitioner 307 and/or updated (e.g., trained) by the private model trainer 320.

The example private model processor 315 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example private model processor 315 implements a neural network according to the model information stored in the private model data store 310. The example neural network of the illustrated example of FIG. 3 is a deep neural network (DNN). However, any other past, present, and/or future neural network topology(ies) and/or architecture(s) may additionally or alternatively be used such as, for example, a convolutional neural network (CNN), a feed-forward neural network.

The example private model trainer 320 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example private model trainer 320 performs training of the private layers of the model stored in the private model data store 310. In examples disclosed herein, training is performed using Stochastic Gradient Descent. However, any other approach to training a neural network and/or other machine learning architecture may additionally or alternatively be used.

The example model update provider 330 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example model update provider 330 provides a model update to the example aggregator 110. In some examples, additional information is provided along with the model update such as, for example, an identity of the edge device 130, an indication of how much training data was used to prepare the model update, and/or other parameters identified as part of the model training process. In examples disclosed herein, the model update provider 330 provides model information concerning the private layers of the model (e.g., model updates resulting from training by the private model trainer 320). However, in some examples, the model update provider 330 may additionally provide model information concerning the public layers of the model. In some examples, the model update provider 330 encrypts the model update prior to transmission to the aggregator device 110.

The example local data accesser 335 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example local data accesser 335 accesses local data to be used for training. In some examples, the local data is provided by trusted input hardware (e.g., trusted input hardware 360), and is trusted such that the local data may be used for training purposes. However, in some examples, the local data may originate from an entity (e.g., a program, a device, etc.) other than the trusted input hardware (e.g., the local data provider 370).

The example query handler 340 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example query handler 340 handles queries received from the trusted input hardware 360 and/or the local data provider 370. The example query handler 340 determines whether the query source is trusted. In examples disclosed herein, the query source is trusted when the query originates from the trusted input hardware 360, and the query source is not trusted when the query originates from the local data provider 370. However, any other approach for determining whether the query source is trusted may additionally or alternatively be used such as, for example, validating a hash provided with the query. If the query sources not trusted, the example query handler 340 stores a record of the query in the query ledger 350, and performs additional analysis of the query to determine whether to allow it to be processed. In some examples, the query is throttled based on receipt of other queries (e.g., previously submitted queries). In some examples, the query handler 340 interacts with the input scanner 345 to determine whether the input appears to be synthetic. In some examples, the query handler 340 determines an amount of information that would be expected to be leaked if the query were to be allowed to execute. Upon execution of the query, the query handler 340 provides the result to the entity that provided the query.

The example input scanner 345 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example input scanner 345 analyzes the received query to determine whether the input appears to be synthetic. Reverse engineering attacks on federated and/or distributed models will typically involve synthesized data of some sort, as the attacker does not have access to the full training dataset. Synthesized data may appear statistically different than real data (e.g., the local data used to train the model). In examples disclosed herein, the input scanner 345 compares the query data to prior training data identified by the hashes stored in the hash ledger 337 (and/or hashes representing the query and/or prior training data). In examples disclosed herein, a query is considered to be synthetic based on its similarity to the local data that was used to train the model. In some examples, similarity to local data may be determined based on respective hashes of the prior queries as compared to a hash of the received query. If the query appears to be synthetic, the example query handler 340 rejects the query.

The example query ledger 350 of the illustrated example of FIG. 3 is implemented by any memory, storage device and/or storage disc for storing data such as, for example, flash memory, magnetic media, optical media, etc. Furthermore, the data stored in the example query ledger 350 may be in any data format such as, for example, binary data, comma delimited data, tab delimited data, structured query language (SQL) structures, etc. While in the illustrated example the example query ledger 350 is illustrated as a single element, the example query ledger 350 and/or any other data storage elements described herein may be implemented by any number and/or type(s) of memories. In the illustrated example of FIG. 3, the example query ledger 350 stores records of prior queries that enable the query handler 340 to identify when queries were received and/or executed.

The example public model data store 352 of the illustrated example of FIG. 3 is implemented by any memory, storage device and/or storage disc for storing data such as, for example, flash memory, magnetic media, optical media, etc. Furthermore, the data stored in the public model data store 352 may be in any data format such as, for example, binary data, comma delimited data, tab delimited data, structured query language (SQL) structures, etc. While in the illustrated example the public model data store 352 is illustrated as a single element, the example public model data store 352 and/or any other data storage elements described herein may be implemented by any number and/or type(s) of memories. In the illustrated example of FIG. 3, the public model data store 352 stores public model information (e.g., public layers corresponding to feature extraction layers of the received machine learning model.

The example public model processor 357 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example public model processor 357 implements a neural network according to the model information stored in the public model data store 352. The example neural network implemented by the example public model processor 357 of the illustrated example of FIG. 3 is a deep neural network (DNN). However, any other past, present, and/or future neural network topology(ies) and/or architecture(s) may additionally or alternatively be used such as, for example, a convolutional neural network (CNN), a feed-forward neural network. In some examples, the public model processor 357 is implemented by a machine learning accelerator such as, for example a graphical processing unit (GPU).

The example trusted input hardware 360 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example trusted input hardware 360 is hardware that is trusted by the local data accesser 335. In examples disclosed herein, trust is established based on pre-exchanged keys and/or hashes. However, trust may be established using any past, present, and/or future approaches.

The example local data provider 370 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example local data provider 370 represents an entity (e.g., a program, a device, etc.) that is not able to establish trust with the local data accesser 335. In examples disclosed herein, because trust between the local data provider 370 and the local data accesser 335 is not established, additional validations are performed before allowing queries submitted by the local data provider 370 and/or training data submitted by the local data provider 370 to be processed.

While an example manner of implementing the edge device 130 of FIG. 1 is illustrated in FIG. 3, one or more of the elements, processes and/or devices illustrated in FIG. 3 may be combined, divided, re-arranged, omitted, eliminated and/or implemented in any other way. Further, the example model receiver 305, the example model partitioner 307, the example private model data store 310, the example private model processor 315, the example private model trainer 320, the example model update provider 330, the example local data accesser 335, the example query handler 340, the example input scanner 345, the example query ledger 350, the example public model data store 352, the example public model processor 357, the example trusted input hardware 360, the example local data provider 370, and/or, more generally, the example edge device 130 may be implemented by hardware, software, firmware and/or any combination of hardware, software and/or firmware. Thus, for example, any of the example model receiver 305, the example model partitioner 307, the example private model data store 310, the example private model processor 315, the example private model trainer 320, the example model update provider 330, the example local data accesser 335, the example query handler 340, the example input scanner 345, the example query ledger 350, the example public model data store 352, the example public model processor 357, the example trusted input hardware 360, the example local data provider 370, and/or, more generally, the example edge device 130 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example model receiver 305, the example model partitioner 307, the example private model data store 310, the example private model processor 315, the example private model trainer 320, the example model update provider 330, the example local data accesser 335, the example query handler 340, the example input scanner 345, the example query ledger 350, the example public model data store 352, the example public model processor 357, the example trusted input hardware 360, the example local data provider 370, and/or, more generally, the example edge device 130 is/are hereby expressly defined to include a non-transitory computer readable storage device or storage disk such as a memory, a digital versatile disk (DVD), a compact disk (CD), a Blu-ray disk, etc. including the software and/or firmware. Further still, the example edge device 130 of FIGS. 1 and/or 3 may include one or more elements, processes and/or devices in addition to, or instead of, those illustrated in FIG. 3, and/or may include more than one of any or all of the illustrated elements, processes and devices.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
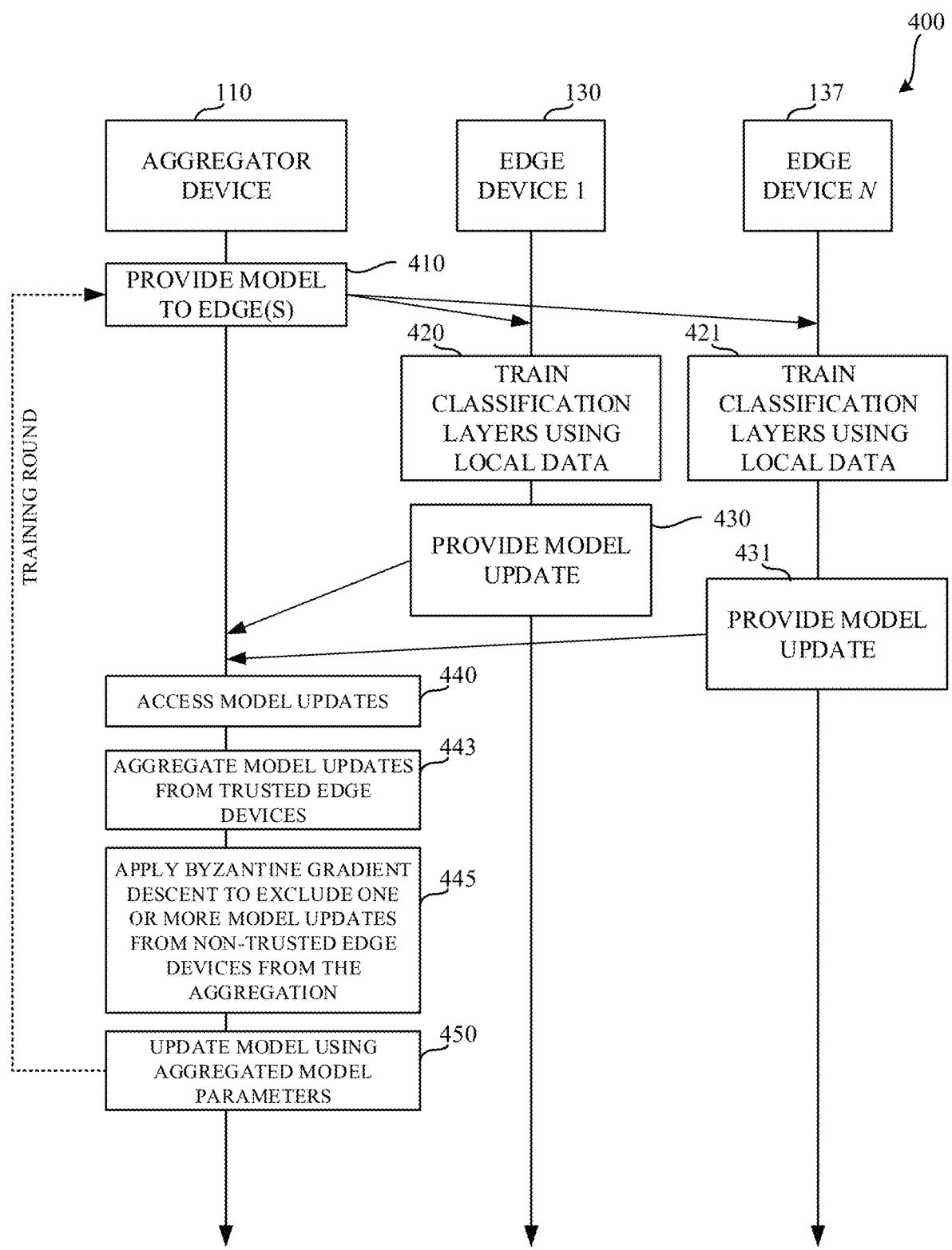
FIG. 4 is a communication diagram representing operations performed at the example aggregator device and/or the example edge devices of FIG. 1.
Figure 5:
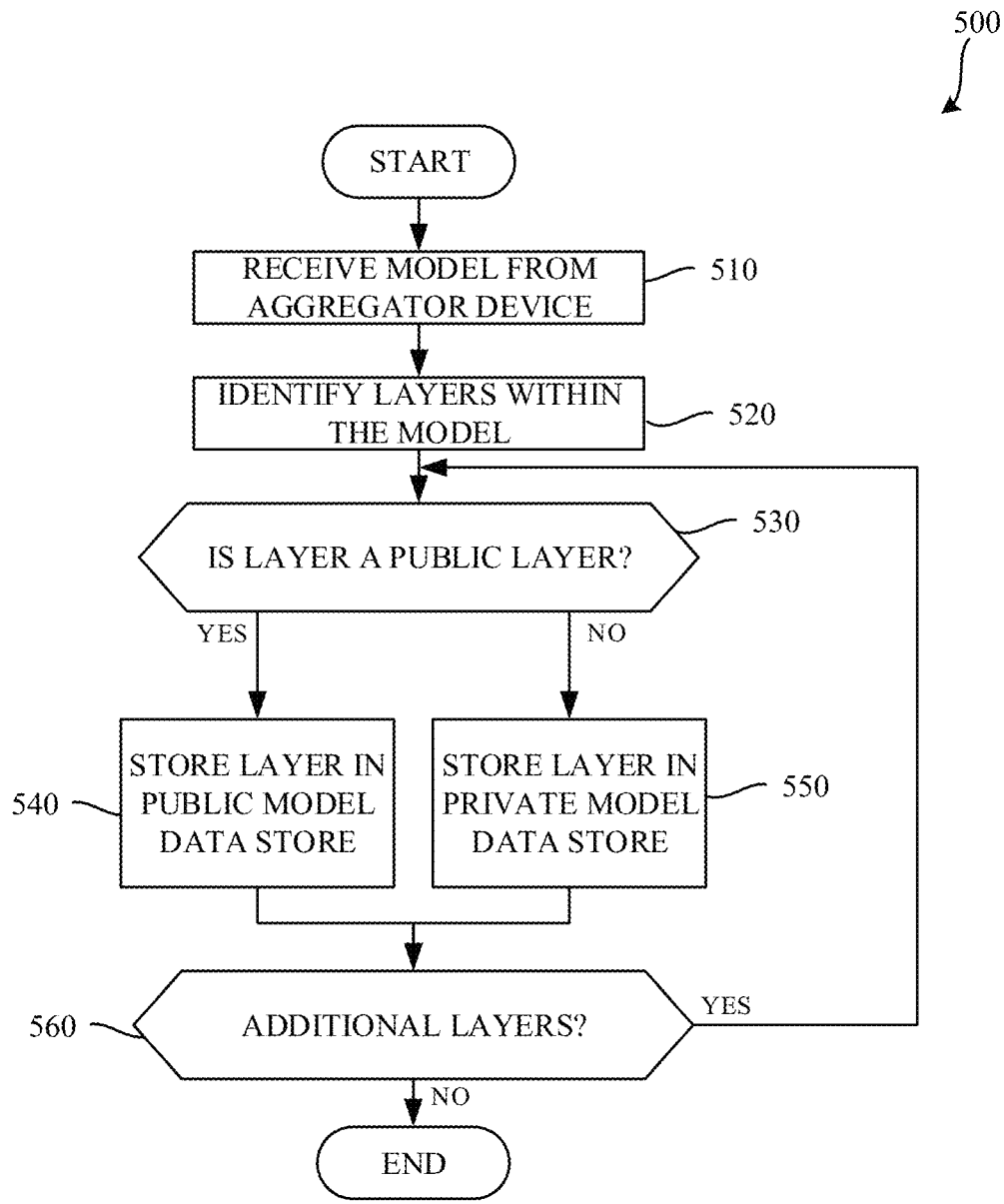
FIG. 5 is a flowchart representative of machine readable instructions which may be executed to implement the example edge device of FIGS. 1 and/or 3 to access a model provided by the example aggregator device of FIG. 1.
Figure 6:
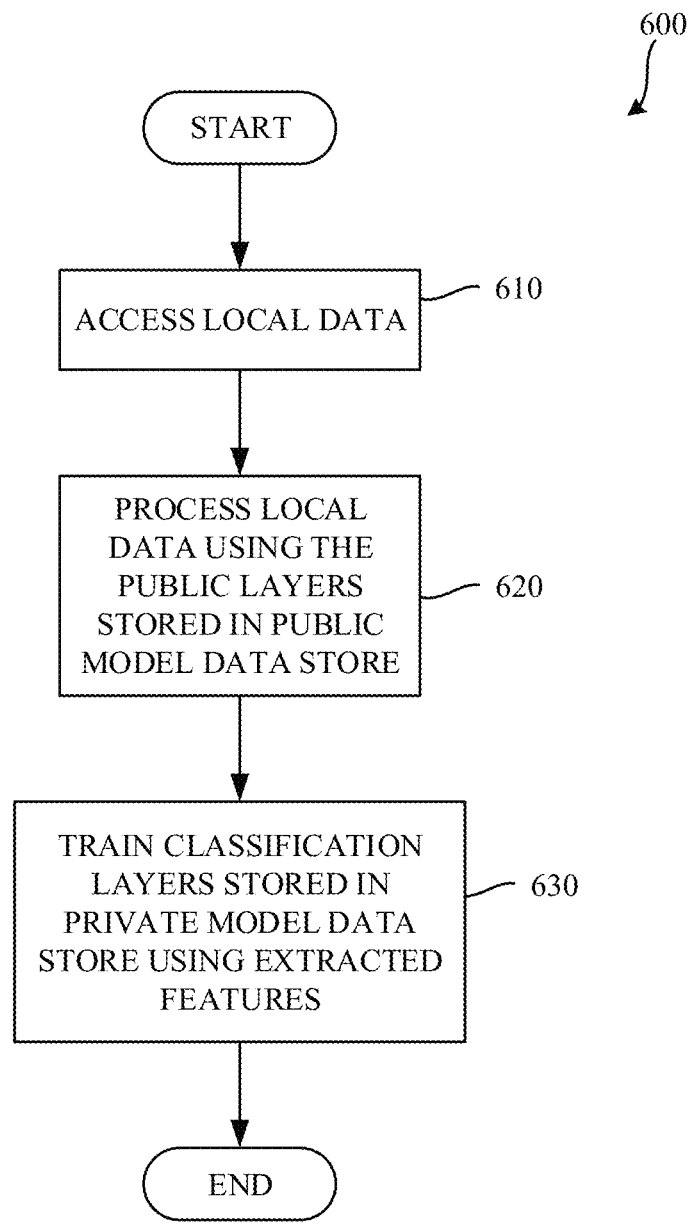
FIG. 6 is a flowchart representative of machine readable instructions which may be executed to implement the example edge device of FIGS. 1 and/or 3 to locally train a model.

Flowcharts representative of example hardware logic or machine readable instructions for implementing the example edge device 130 of FIG. 3 are shown in FIGS. 4, 5, 6, and/or 7. The machine readable instructions may be an executable computer program or portion of an executable computer program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4, 5, 6, and/or 7, many other methods of implementing the example edge device 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4, 5, 6, and./or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 4 is a communication diagram representing operations 400 performed at the example aggregator device 110 and/or the example edge devices 130, 137 of FIG. 1. The example process 400 of FIG. 4 begins when the example aggregator device 110 provides the current state of the machine learning model to each edge device 130, 137. (Block 410). The model provided by the aggregator device 110 may be initialized in any way (including pre-training on public data), or may be the model learned in a previous training round.

Upon receipt of the model data, each of the edge devices 130, 137 partitions the model into public and private layers. The edge devices 130, 137 train the private (e.g., classification) layers of the model using local data. (Block 420, 421). In examples disclosed herein, the private model trainer 320 of the example edge device 130 instructs the private model processor 315 to train using the local data accessed by the local data accesser 335. As a result of the training, a model update for that training round is created and is stored in the local model data store 310. In examples disclosed herein, the model update can be computed with any sort of model learning algorithm such that the aggregation function does not require access to the original data such as, for example, Stochastic Gradient Descent.

Each edge 130, 137 transmits its model update to the aggregator device 110 for aggregation. (Blocks 430, 431). The example aggregator device 110 accesses the results provided by the edge devices 130, 137. (Block 440). In some examples, the model updates are aggregated as they arrive at the aggregator device 110 (e.g., in a streaming average). In some examples, Byzantine Gradient Descent is used to exclude extreme model update results. In the illustrated example of FIG. 4, the example aggregator device 110 aggregates model updates from trusted edge devices. (Block 443). That is, if a model update is received from a trusted edge device (e.g., an edge device that implements a trusted execution environment), it is automatically included in the aggregation. The example aggregator device 110 applies Byzantine Gradient Descent to model updates that originate from non-trusted edge devices. (Block 445). Applying Byzantine Gradient Descent to model updates originating from non-trusted edge devices enables elimination of extreme model updates (which may potentially be malicious). In some examples, the example aggregator device 110 throttles the aggregation of updates, thereby allowing a given node to influence the central model every N training iterations.

Using the aggregated model updates, the example aggregator device 110 updates a centrally stored model. (Block 450). The updated model then serves as a new model for the next training iteration, and control proceeds to block 410 where the process of FIG. 4 is repeated. In examples disclosed herein, each transition from block 450 to 410 is referred to as a round and/or a training iteration. By allowing multiple rounds to be performed, the example system enables models to be adjusted over time to adapt to changing input data.

FIG. 5 is a flowchart representative of machine readable instructions 500 which may be executed to implement the example edge device 130 of FIGS. 1 and/or 3 to access a model provided by the aggregator device 110. The example process 500 of the illustrated example of FIG. 5 begins when the example local data accesser 335 receives a model from the aggregator device 110. (Block 510). The example model partitioner 307 processes the received model to separate private layers from public layers. Such processing begins with the example model partitioner 307 identifying the layers included in the model. (Block 520).

For each of the identified layers, the example model partitioner 307 determines whether the layer is a public layer. (Block 530). In some examples, private layers are encrypted to ensure that the private nature of those layers is protected while the model is being transmitted from the aggregator 110 to the edge device 130. In such an example, the example model partitioner 307 determines whether the layer is private or public based on whether the layer is encrypted. Thus, if a layer is not encrypted, the layer is identified as public.

In some examples, the example model partitioner 307 determines whether the layer is private or public based on a type of the layer. Many different types of machine learning layers may be used as components of the model such as, for example, a convolutional layer, a pooling layer, a fully connected layer, a concatenation layer, a normalization layer, a dropout layer, a softmax layer, etc. In some examples, particular types of layers are indicative of layers that perform feature extraction. For example, convolutional layers are more likely to be used for feature extraction tasks (e.g., are public layers), whereas softmax layers are more likely to be used as classification tasks (e.g., are private layers).

In some examples, the layers are handled in a linear fashion corresponding to an order in which the layers are to be processed. That is, a first layer that is to accept an initial input (e.g., corresponding to the first layer 231 of FIG. 2) is identified first, and subsequent layers are handled until a final layer (e.g., corresponding to the final layer 233 of FIG. 2) is handled. In such an example, once a layer is identified as a private layer, all subsequent layers may be automatically identified as private layers. In many implementations, a large percentage (e.g., 99.5%) of the layers will be identified as public layers. However, any other percentage of layers may be identified as public layers.

If the example model partitioner 307 determines that the identified layer is a public layer (e.g., block 530 returns a result of YES), the example model partitioner 307 stores the layer in the public model data store 352 (Block 540). Conversely, if the example model partitioner 307 determines that the identified layer is not a public layer (e.g., block 530 returns a result of NO), the example model partitioner 307 stores the layer in the private model data store 310 (Block 550). The example model partitioner 307 determines whether there any other layers to process. (Block 560). If there are additional layers to process (e.g., block 560 returns a result of YES), the example process of blocks 530 through 560 is repeated until no additional layers remain to be processed (e.g., until block 560 returns a result of NO). Once all layers have been processed (e.g., block 560 returns a result of NO), the example process 500 of the illustrated example of FIG. 5 terminates. The example process 500 of the illustrated example of FIG. 5 may then be repeated upon subsequent receipt of a model from the aggregator device 110.

FIG. 6 is a flowchart representative of machine readable instructions 600 which may be executed to implement the example edge device 130 of FIGS. 1 and/or 3 to locally train a model. The example process 600 of FIG. 6 corresponds to blocks 420 and/or 421 of FIG. 4. The example process 600 of FIG. 6 begins when the example local data throttler 325 collects local training data that is to be used during training of the model. (Block 610). In some examples, validation of the local data that will be used for training may additionally or alternatively be performed. For example, a local training data commitment process may be used to identify training data that is legitimate for use in training purposes.

In examples disclosed herein, the public layers (e.g., the feature extraction layers) are provided in a trained state and, as a result, are not involved in training at the edge device(s). The example local data accesser 335 causes the example public model processor 357 to process the local data using the public layers stored in the public model data store 352. (Block 620). By processing the local data using the public layers, the example public model processor 357 identifies extracted features in the local data. Such features are used as training inputs for the private layers (e.g., the classification layers). Using the output of the public model processor 357, the private model trainer 320 trains the private layers of the model. Updated private layer model parameters are stored in the example private model data store 310, and may be used to subsequently classify local data. Moreover, as described in connection with blocks 430 and/or 431 of FIG. 4, the private model parameters may be provided to the example aggregator 110, thereby enabling the training results of multiple edge devices to be aggregated.

Figure 7:
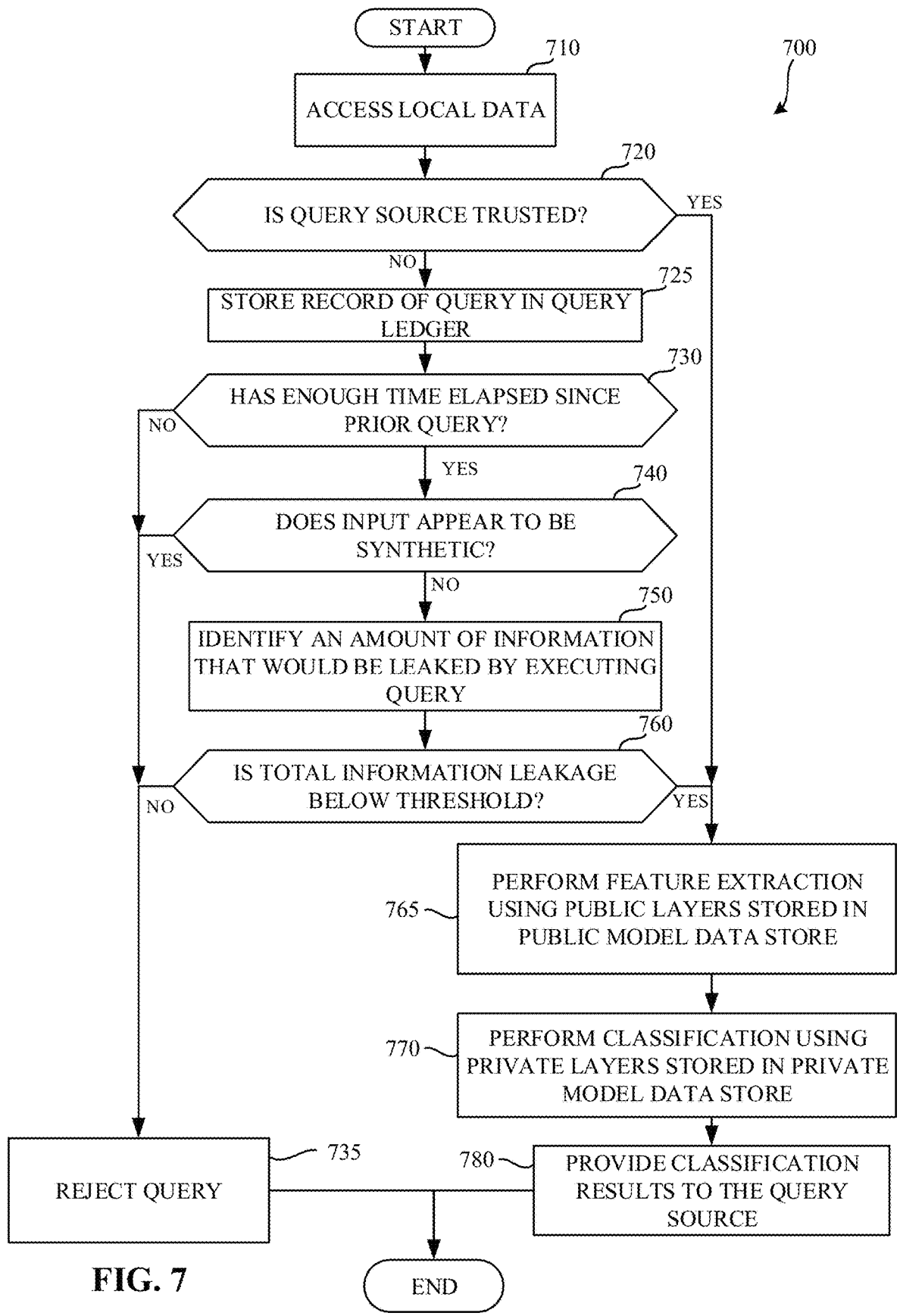
FIG. 7 is a flowchart representative of machine readable instructions which may be executed to implement the example edge device of FIGS. 1 and/or 3 to classify input data.

FIG. 7 is a flowchart representative of machine readable instructions 700 which may be executed to implement the example edge device 130 of FIGS. 1 and/or 3 to classify input data. The example process 700 the illustrated example of FIG. 7 begins when the example query handler 340 accesses a received query including local data. (Block 710). In examples disclosed herein, the received query may originate from the trusted input hardware 360 or the local data provider 370. That is, the query may originate from a trusted source or a non-trusted source. Many TEEs provide roots of trust from which to establish secure channels. If the model queries are originating from known, trusted endpoints, then the system can know a priori whether these queries are possibly part of a reverse engineering attack. A query from a non-trusted source may, for example, be an attack to attempt to discover the model stored in the local model data store 310. If the query were to originate from a non-trusted source, additional checks are put in place before allowing the query to be executed.

The example query handler 340 determines whether the query source is trusted. (Block 720). In examples disclosed herein, the query source is trusted when the query originates from the trusted input hardware 360, and the query sources not trusted when the query originates from the local data provider 370. However, any other approach for determining whether the query sources is trusted may additionally or alternatively be used such as, for example, validating a hash provided with the query. If the query sources not trusted (e.g., block 720 returns a result of NO), the example query handler 340 stores a record of the query in the query ledger

350. (Block 725). The records stored in the example query ledger 350 enables the query handler 340 to identify when queries were received and/or executed.

The example query handler 340 determines whether enough time has elapsed since a prior query. (Block 730). Reverse engineering attacks typically require far more model queries than legitimate use cases, especially when the attacker does not have access to the data used to train the model (a typical precondition of federated and/or distributed learning systems). Many TEEs provide trusted time services where the code executing in the TEE can be assured how much time has passed since the code began executing. In examples disclosed herein, such trusted time components are used to ensure a maximum total number of queries per second that would suffice for the use case, but severely limit reverse engineering attacks. In examples disclosed herein, the query handler 340 compares a timestamp representing a time at which the query was received against timestamp stored in the query ledger 350. In examples disclosed herein, the example query handler 340 determines that enough time has elapsed since a prior query when the smallest difference between the timestamp of the present query and any prior query stored in the example query ledger 350 is greater than a threshold amount of time.

In examples disclosed herein the threshold amount of time is one query per second. However, any other threshold may additionally or alternatively be used. Using a threshold amount of time ensures that untrusted query sources are not allowed to repeatedly submit queries in an attempt to discover the model stored in the local model data store 310. The success of this validation greatly depends on the query rate (e.g., threshold amount of time) required to meet the intended functionality and the query rate required to attack the system. Put another way, a "query budget" is used that is intended to be sufficient for legitimate tasks, but insufficient for reverse engineering attacks.

If the example query handler 340 determines that enough time has not elapsed since the prior query (e.g., block 730 returns a result of NO), the example query handler 340 rejects the query. (Block 735). In examples disclosed herein, the query handler 340 provides a message to the query source indicating that the query has been rejected. However, in some examples, no response message is provided to the query source.

If the example query handler 340 determines that enough time has elapsed since the prior query (e.g., block 730 returns a result of YES), the example input scanner 345 analyzes the received query to determine whether the input appears to be synthetic. (Block 740). Reverse engineering attacks on federated and/or distributed models will typically involve synthesized data of some sort, as the attacker does not have access to the full training dataset. Synthesized data may appear statistically different than real data (e.g., the local data used to train the model). That is, the same TEE 132 training and running queries against the model would provide the very integrity needed to run such input analysis-based reverse engineering detection. In examples disclosed herein, a query is considered to be synthetic based on its similarity to the local data that was used to train the model. In some examples, similarity to local data may be determined based on respective hashes of the prior queries as compared to a hash of the received query. If the query appears to be synthetic (e.g., block 740 returns a result of YES), the example query handler 340 rejects the query. (Block 735).

If the query does not appear to be synthetic (e.g., block 740 returns result of NO), the example input scanner determines an amount of information that would be leaked by executing and/or providing a response to the query. (Block 750). The example input scanner 345 determines whether the amount of information that may be leaked by executing and or providing a response to the query is below a threshold. (Block 760). In some examples, the example input scanner 345 computes an amount of information that may be leaked with respect to the individual query that has been requested to be executed. Amounts of information leakage on any other time scale may additionally or alternatively be used such as, for example, for the lifetime of the operation of the edge device, over a past amount of time (e.g., ten minutes, one hour, one week), with respect to the current model stored in the local model data store 310, etc. If the total amount of information leakage is above the threshold (e.g., block 760 returns a result of NO), the example query handler rejects the query. (Block 735).

If the total amount of information leakage is below the threshold (e.g., block 760 returns a result of YES), or if the query source is trusted (e.g., block 720 returns a result of YES), then the query will be processed. The example query handler 340 instructs the public model processor 357 to perform feature extraction using the public layers (e.g., feature extraction layers) stored in the public model data store 352. (Block 765).

The example query handler 340 instructs the private model processor 315 to perform classification using the private layers stored in the example private model data store 310. (Block 770). In examples disclosed herein, the classification is performed based on the features extracted by the feature extraction layers in block 765. In examples disclosed herein, the public model processor 357 provides the extracted features to the private model processor 315. However, in some examples, the query handler 340 acts as an intermediary between the public model processor 357 and the private model processor 315 and provides the extracted features to the private model processor 315.

In examples disclosed herein, the private layers from a prior training round is/are used for the classification. Selecting the private layers from the prior training round ensures that those layers that might have been modified by training at the edge device are not used. Moreover, such an approach reduces the likelihood that the private layers might be discovered by repeatedly querying the model. In some examples, the ability to perform training (e.g., as described in connection with FIG. 6) may be restricted such that an edge device may only be allowed to train every N rounds. In such an example, the private model processor 315 utilizes the private layers from a most recent model provided by the aggregator device 110 during a non-training round. In some examples, the private layers utilized for the classification may be from the model of the current round (e.g., if training is not enabled for that edge device for that round).

In the illustrated example of FIG. 7, the processing of public layers is performed prior to the processing of private layers. While such an arrangement is useful for many machine-learning implementations, in some example implementations the processing of private layers and public layers may be intermixed. For example, a feature extraction layer intermediate other feature extraction layers may be private, such that processing is first performed by a first public layer, a first private layer, a second public layer, and finally a second private layer. In some examples, the second public layer may be considered a private layer such that it is processed by the private model processor 315, thereby reducing the need to switch between processing at the private model processor 315 and the public model processor 357.

Upon completion of the processing of the input data to create a classification result(s), the example query handler 340 provides the classification result(s) to the query source. (Block 780). The example process 700 of the illustrated example of FIG. 7 then terminates. The example process 700 of the illustrated example of FIG. 7 may then be repeated upon subsequent receipt of a query.

Figure 8:
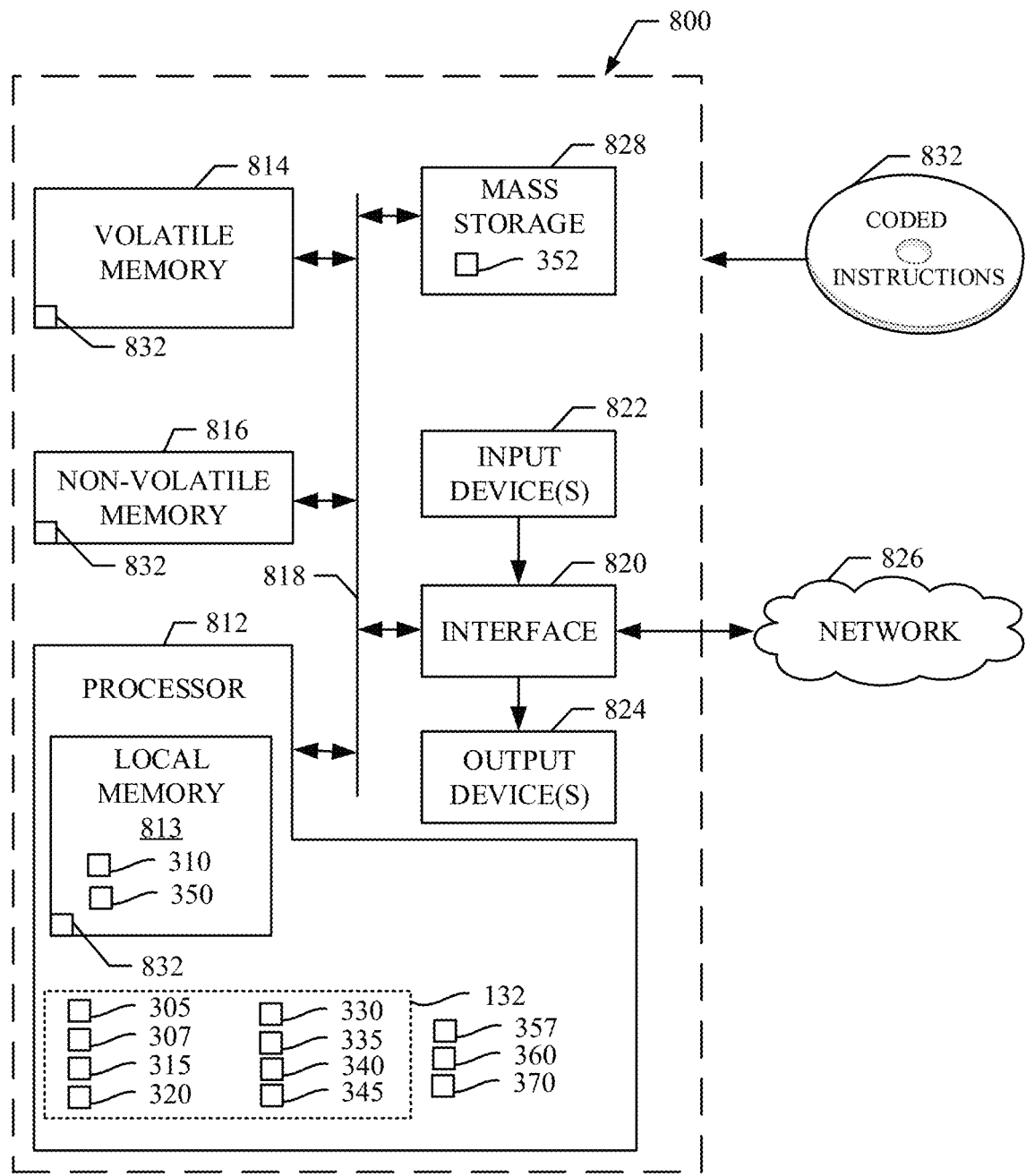
FIG. 8 is a block diagram of an example processing platform structured to execute the instructions of FIGS. 4, 5, 6, and/or 7 to implement the example edge device of FIGS. 1 and/or 3.

FIG. 8 is a block diagram of an example processor platform 800 structured to execute the instructions of FIGS. 4, 5, 6, and/or 7 to implement the example edge device 130 of FIGS. 1 and/or 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example model receiver 305, the example model partitioner 307, the example private model processor 315, the example private model trainer 320, the example model update provider 330, the example local data accesser 335, the example query handler 340, the example input scanner 345, the example public model processor 357, the example trusted input hardware 360, and/or the example local data provider 370. In the illustrated example of FIG. 8, the example model receiver 305, the example model partitioner 307, the example private model processor 315, the example private model trainer 320, the example model update provider 330, the example local data accesser 335, the example query handler 340, and the example input scanner 345 are implemented within the trusted execution environment 132.

The processor 812 of the illustrated example includes a local memory 813 (e.g., a cache). The local memory 813 implements the private model data store 310 and the example query ledger 350 (which may be implemented as a part of the trusted execution environment 132). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4, 5, 6, and/or 7 may be stored in the mass storage device 828, in the volatile memory 814, in the non-volatile memory 816, and/or on a removable non-transitory computer readable storage medium such as a CD or DVD. In the illustrated example of FIG. 8, the example mass storage device 828 implements the example public model data store 352.

From the foregoing, it will be appreciated that example methods, apparatus and articles of manufacture have been disclosed that enable distributed training of a neural network that is robust against potential attack vectors that may attempt to damage and/or discover the machine learning model, while also enables public layers (e.g., feature extraction layers) of the machine learning model to be implemented outside of a trusted execution environment, while protecting private layers (e.g., classification layers) within the trusted execution environment. Executing a portion of the machine learning model outside of the trusted execution environment results in increase performance of the edge device.

Example 1 includes an edge device for distributed use of a machine learning model, the edge device comprising a model partitioner to partition the machine learning model received from an aggregator into private layers and public layers, a public model data store implemented outside of a trusted execution environment of the edge device, the model partitioner to store the public layers in the public model data store, and a private model data store implemented within the trusted execution environment of the edge device, the model partitioner to store the private layers in the private model data store.

Example 2 includes the edge device of example 1, further including a public model processor to identify a feature in local data using the public layers, a private model trainer to train the private layers using the feature, and a model update provider to provide the trained private layers to the aggregator.

Example 3 includes the edge device of example 2, wherein the private model trainer is implemented within the trusted execution environment.

Example 4 includes the edge device of example 2, wherein the public model processor is implemented outside of the trusted execution environment.

Example 5 includes the edge device of example 2, wherein the local data is first local data, the feature is a first feature, and further including a query handler to cause the public model processor to identify a second feature of second local data provided in a query, and a private model processor to utilize the private layers to generate a classification output based on the second feature, the query handler to provide the classification output as a result of the query.

Example 6 includes the edge device of example 5, wherein the private model processor is implemented within the trusted execution environment.

Example 7 includes the edge device of example 5, wherein the query handler is to access the query from at least one of trusted input hardware or a local data provider.

Example 8 includes the edge device of example 1, wherein the model partitioner is to identify a layer of the machine learning model as one of the private layers when the layer is encrypted.

Example 9 includes the edge device of example 1, wherein the model partitioner is to identify a layer of the machine learning model as one of the private layers based on whether the layer is fully connected.

Example 10 includes the edge device of example 1, wherein the model partitioner is to identify a layer of the machine learning model as one of the private layers based on whether the layer is a convolutional layer.

Example 11 includes the edge device of example 1, wherein the public layers represent feature extraction layers.

Example 12 includes the edge device of example 1, wherein the private layers represent confidential classification layers.

Example 13 includes the edge device of example 12, wherein the storing of the private layers within the trusted execution environment preserves the confidentiality of the private layers.

Example 14 includes at least one non-transitory machine-readable medium comprising instructions which, when executed, cause a machine to at least partition a machine learning model received from an aggregator into private layers and public layers, store the public layers in a public model data store, the public model data store implemented outside of a trusted execution environment, and store the private layers in a private model data store, the private model data store implemented inside the trusted execution environment.

Example 15 includes the at least one machine-readable medium of example 14, wherein the instructions, when executed, further cause the machine to at least identify a feature in local data using the public layers, train the private layers using the feature, and provide the trained private layers to the aggregator.

Example 16 includes the at least one machine-readable medium of example 15, wherein the local data is first local data, the feature is a first feature, and the instructions, when executed, further cause the machine to at least utilize the public layers to identify a second feature of second local data provided in a query, utilize the private layers to generate a classification output based on the second feature, and provide the classification output as a result of the query.

Example 17 includes the at least one machine-readable medium of example 16, wherein the query is received from at least one of trusted input hardware or a local data provider.

Example 18 includes the at least one machine-readable medium of example 14, wherein the partitioning of the machine learning model into the private layers and the public layers is based on whether a layer to be partitioned is encrypted.

Example 19 includes the at least one machine-readable medium of example 14, wherein the partitioning of the machine learning model into the private layers and the public layers is based on whether a layer to be partitioned is fully connected.

Example 20 includes the at least one machine-readable medium of example 14, wherein the partitioning of the machine learning model into the private layers and the public layers is based on whether a layer to be partitioned is a convolutional layer.

Example 21 includes the at least one machine-readable medium of example 14, wherein the public layers represent feature extraction layers.

Example 22 includes the at least one machine-readable medium of example 14, wherein the private layers represent confidential classification layers.

Example 23 includes the at least one machine-readable medium of example 22, wherein the storing of the private layers within the trusted execution environment ensures the confidentiality of the private layers.

Example 24 includes a method for distributed use of machine learning models, the method comprising partitioning, by executing an instruction with at least one hardware processor, a machine learning model received from an aggregator into private layers and public layers, storing the public layers in a public model data store, the public model data store implemented outside of a trusted execution environment, and storing the private layers in a private model data store, the private model data store implemented inside the trusted execution environment.

Example 25 includes the method of example 24, further including utilizing the public layers to identify a feature in local data, training the private layers using the feature, and providing the trained private layers to the aggregator.

Example 26 includes the method of example 25, wherein the local data is first local data, the feature is a first feature, and further including utilizing the public layers to identify a second feature of second local data provided in a query, utilizing the private layers to generate a classification output based on the second feature, and providing the classification output as a result of the query.

Example 27 includes the method of example 26, wherein the query is received from at least one of trusted input hardware or a local data provider.

Example 28 includes the method of example 24, wherein the partitioning of the machine learning model into the private layers and the public layers is based on whether the layer to be partitioned is encrypted.

Example 29 includes the method of example 24, wherein the partitioning of the machine learning model into the private layers and the public layers is based on whether the layer to be partitioned is fully connected.

Example 30 includes the method of example 24, wherein the partitioning of the machine learning model into the private layers and the public layers is based on whether the layer to be partitioned is a convolutional layer.

Example 31 includes the method of example 24, wherein the public layers represent feature extraction layers.

Example 32 includes the method of example 24, wherein the private layers represent confidential classification layers.

Example 33 includes the method of example 32, wherein the storing of the private layers within the trusted execution environment ensures that the confidentiality of the private layers is preserved.

Example 34 includes an edge device for distributed use of a machine learning model, the edge device comprising means for partitioning the machine learning model received from an aggregator into private layers and public layers, first means for storing the public layers outside of a trusted execution environment of the edge device, and second means for storing the private layers inside the trusted execution environment of the edge device.

Example 35 includes the edge device of example 34, further including means for processing the public layers to identify a feature in local data, means for training the private layers using the feature, and means for providing the trained private layers to the aggregator.

Example 36 includes the edge device of example 35, wherein the means for processing is implemented outside of the trusted execution environment.

Example 37 includes the edge device of example 35, wherein the means for training is implemented within the trusted execution environment.

Example 38 includes the edge device of example 35, wherein the local data is first local data, the feature is a first feature, the means for processing is first means for processing, and further including means for causing the first means for processing to identify a second feature of second local data provided in a query, and second means for processing to utilize the private layers to generate a classification output based on the second feature, the means for causing to provide the classification output as a result of the query.

Example 39 includes the edge device of example 38, wherein the second means for processing is implemented within the trusted execution environment.

Example 40 includes the edge device of example 38, wherein the means for causing is to access the query from at least one of trusted input hardware or a local data provider.

Example 41 includes the edge device of example 34, wherein the means for partitioning is to identify a layer of the machine learning model as one of the private layers when the layer is encrypted.

Example 42 includes the edge device of example 34, wherein the means for partitioning is to identify a layer of the machine learning model as one of the private layers based on whether the layer is fully connected.

Example 43 includes the edge device of example 34, wherein the means for partitioning is to identify a layer of the machine learning model as one of the private layers based on whether the layer is a convolutional layer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An edge device for distributed use of a machine learning model, the edge device comprising:
   a private model data store implemented within a trusted execution environment of the edge device;
   private model processor circuitry to execute first instructions to:
      partition a machine learning model received from an aggregator into private layers and public layers based on layer type, the machine learning model including intermixed private and public layers with at least one public layer receiving input from a private layer; and
      store the private layers in the private model data store;
   a public model data store implemented outside of the trusted execution environment of the edge device; and
   public model processor circuitry to execute second instructions to store the public layers in the public model data store.

2. The edge device of claim 1,
   wherein the public model processor circuitry to execute the second instructions to identify a feature in local data using the public layers; and
   wherein the private model processor circuitry is to execute the first instructions to:
   train the private layers; and
   provide the trained private layers to the aggregator.

3. The edge device of claim 2, wherein the private model processor circuitry is to execute the first instructions to train the private layers within the trusted execution environment.

4. The edge device of claim 2, wherein the public model processor circuitry is to execute the second instructions to identify a feature in local data using the public layers outside of the trusted execution environment.

5. The edge device of claim 2, wherein the local data is first local data, the feature is a first feature, and wherein the public model processor circuitry is to execute the second instructions to:
   identify a second feature of second local data provided in a query; and
   wherein the private model processor circuitry is to execute the first instructions to utilize the private layers to generate a classification output based on the second feature.

6. The edge device of claim 5, wherein the private model processor circuitry is to execute the first instructions to utilize the private layers to generate a classification output within the trusted execution environment.

7. The edge device of claim 5, wherein the private model processor circuitry is to execute the first instructions to access the query from at least one of trusted input hardware or a local data provider.

8. The edge device of claim 1, wherein the private model processor circuitry is to execute the first instructions to is to identify a layer of the machine learning model as one of the private layers when the layer is encrypted.

9. The edge device of claim 1, wherein the private model processor circuitry is to execute the first instructions to identify a layer of the machine learning model as one of the private layers based on whether the layer is fully connected.

10. The edge device of claim 1, wherein the private model processor circuitry is to execute the first instructions to identify a layer of the machine learning model as one of the private layers based on whether the layer is a convolutional layer.

11. The edge device of claim 1, wherein the public layers represent feature extraction layers.

12. The edge device of claim 1, wherein the private layers represent confidential classification layers that are stored within the trusted execution environment to preserve the confidentiality of the private layers.

13. At least one non-transitory machine-readable medium comprising instructions which, when executed, cause a machine to at least:
  partition a machine learning model received from an aggregator into private layers and public layers based on layer type, the machine learning model including intermixed private and public layers with at least one public layer receiving input from a private layer;
  store the public layers in a public model data store, the public model data store implemented outside of a trusted execution environment; and
  store the private layers in a private model data store, the private model data store implemented inside the trusted execution environment.

14. The at least one machine-readable medium of claim 13, wherein the instructions, when executed, further cause the machine to at least:
  identify a feature in local data using the public layers;
  train the private layers using the feature; and
  provide the trained private layers to the aggregator.

15. The at least one machine-readable medium of claim 14, wherein the local data is first local data, the feature is a first feature, and the instructions, when executed, further cause the machine to at least:
  utilize the public layers to identify a second feature of second local data provided in a query;
  utilize the private layers to generate a classification output based on the second feature; and
  provide the classification output as a result of the query.

16. The at least one machine-readable medium of claim 15, wherein the query is received from at least one of trusted input hardware or a local data provider.

17. The at least one machine-readable medium of claim 13, wherein the partitioning of the machine learning model into the private layers and the public layers is based on whether a layer to be partitioned is encrypted.

18. A method for distributed use of machine learning models, the method comprising:
  partitioning, by executing an instruction with at least one hardware processor, a machine learning model received from an aggregator into private layers and public layers based on layer type, the machine learning model including intermixed private and public layers with at least one public layer receiving input from a private layer;
  storing the public layers in a public model data store, the public model data store implemented outside of a trusted execution environment; and
  storing the private layers in a private model data store, the private model data store implemented inside the trusted execution environment.

19. The edge device of claim 1, wherein the processor circuitry is to execute the instructions to:
  process a first public layer within the trusted execution environment;
  process a first private layer outside the trusted execution environment;
  process a second private layer within the trusted execution environment; and
  process a second public layer within the trusted execution environment to reduce switching between processing environments.

* * * * *